United States Patent Office 3,383,365
Patented May 14, 1968

3,383,365
POLYURETHANE ELASTOMERS DERIVED FROM DIPIPERIDYL CHAIN EXTENDERS
Clifton W. Tate, Cary, and Tommy L. Tolbert, Chapel Hill, N.C., assignors to Monsanto Company, St. Louis, Mo., a corporation of Delaware
No Drawing. Filed Sept. 9, 1964, Ser. No. 395,289
5 Claims. (Cl. 260—75)

ABSTRACT OF THE DISCLOSURE

Fiber forming elastomers having specific viscosities above 0.18 may be prepared by reacting isocyanate terminated polyurethane prepolymers with dipiperidyl or alkyl derivatives thereof. The prepolymers are commonly hydroxy terminated polyethers and polyesters. In an example 1 gm. of 4,4'-dipiperidyl was dissolved in 100 ml. of dimethyl formamide and mixed with 1,020 grams of a polyurethane prepolymer prepared from reacting 80 pts. of 3-caprolactone and 20 pts. methyl caprolactone to form a polyester having a molecular weight of 2,000. 262 gms. of p,p'-methylene diphenyl isocyanate was added to form the prepolymer.

Dipiperidyls are employed as chain extenders in the preparation of linear, segmented, polyurethane elastomers which are particularly useful in the production of elastic fibers.

---

This invention relates to synthetic, fiber-forming elastomers derived from segmented linear polymers. More particularly, this invention relates to fiber-forming elastomers composed of polymers having alternating "soft" and "hard" segments in their internal structure, with the "hard" segment being derived from a dipiperidyl.

Polymers of this general type have recently found wide application in the manufacture of elastic fibers and filaments. That is, polymers typified structurally by the presence of a low-melting or "soft" polymer segment joined by a urethane linkage to a high-melting or "hard" segment are known to provide an elastic property to fibers when they are produced from these polymeric materials.

Although elastic fibers obtained from previously known segmented polymers of the above type have many advantageous properties and much to commend them, there has been a continuing search to develop similar fibers which have a desired combination of advantageous properties, such as good tenacity, tensile recovery, and stability to ultra violet light and chlorine bleach.

It is an object of this invention to provide synthetic, fiber-forming elastomers having characteristics satisfactory for commercial use.

It is a further object of this invention to provide a synthetic, fiber-forming elastomer composed of segmented linear polymers which has a high tenacity and tensile recovery.

Other objects will appear as a description of this invention proceeds.

These and other objects are accomplished by providing a synthetic, fiber-forming elastomer which is composed of a segmented polymer consisting of a plurality of intra-linear structural units having the formula:

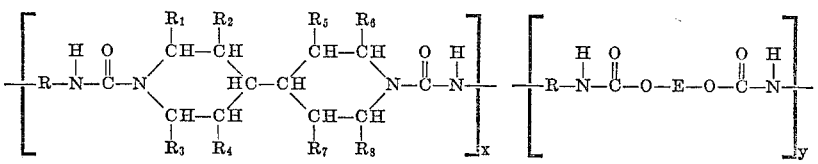

wherein R is an aromatic radical selected from the class consisting of phenylene, biphenylene and alkylene diphenyl radicals, $R_1$ through $R_8$, which may be the same or different are members selected from the class consisting of methyl radicals, ethyl radicals, and hydrogen, E is a long chain linear polymeric radical containing recurring linkages selected from the class consisting of ester and ether groups and $x$ and $y$ are integers greater than zero.

As has been noted, the elastomers of this invention are composed of "soft" segments and "hard" segments alternating in the polymer chain. The "soft" segment is composed of the residue on removal of the terminal OH groups from a hydroxyl-terminated polyester or polyether having a melting point below about 60° C. and a molecular weight in the range of about 600 to 5,000. The segment is connected through urethane linkages to a second or "hard" segment which constitutes at least one repeating unit of a urea polymer having a melting point of about 200° C. when in a molecular weight above about 10,000. It is the novel employment of a dipiperidyl as a reactant to form the second or "hard" segment which greatly contributes to the advantageous properties of the synthetic fiber-forming elastomers of this invention.

These polymeric materials may be prepared by the well-known, generally practiced procedure for preparing polymers of the segmented type. Typically, a low molecular weight hydroxyl terminated polyester or polyether is first reacted with an aromatic diisocyanate to produce the isocyanate-terminated "prepolymer" or "soft" segment. The diisocyanate is employed in molar excess over the polyhydroxyl compound. That is, in a molar ratio of from 2.5:1.0 to 1.5:1.0, with 2.0:1.0 being preferred. This isocyanate-terminated, or "capped" polymeric intermediate is then reacted with the novel chain extending compound, dipiperidyl, to form that portion of the resulting polymer which contains urea linkages and constitutes the "hard" segment.

The reactions employed to form these polymers are carried out at moderate temperatures. The reaction of the diisocyanate with the polyhydroxyl compound may be carried out by admixing the anhydrous reagents at steam bath temperatures. However, with the use of known catalysts, for example, stannous octoate, when employing a polyester reagent, this "capping" reaction may be conducted at room temperature. The polymerization of the isocyanate-terminated polyester or polyether with the dipiperidyl is generally carried out at temperatures close to room temperature and requires no catalyst.

Various methods of polymerization may be used in the reaction of the isocyanate-terminated prepolymer with dipiperidyl, for example, bulk inter-facial or solution techniques may be employed. However, solution polymerization is the preferred method. The solvent employed is one which is relatively inert to the reactants. Suitable solvents include N,N-dimethylformamide, N,N-dimethylacetamide, tetrahydrofuran and dimethylsulfoxide. Dimethylformamide and dimethylacetamide are preferred especially since solutions suitable for the spinning of fibers may be made directly in these solvents.

As indicated above, the "soft" segments of the elastomer are derived from a hydroxyl-terminated polymer which may be represented by the formula

HO—E—OH wherein E is a long chain polymeric radical containing recurring ester or ether linkages, i.e. a polyester or polyether. Essential features are that the polyester or polyether be difunctional, have a melting point below about 60° C. and a molecular weight in the range of about 600 to 5,000 with from 750 to 3,500 being preferred.

The low molecular weight, linear polyesters used in the practice of this invention can be prepared by reacting acids, esters, or acid halides with a molar excess of glycols. Suitable glycols are the polymethylene glycols, e.g., ethylene, propylene, butylene, decamethylene, substituted polymethylene glycols, such as, 2,2-dimethyl-1,3-propanediol and cycloaliphatic glycols such as cyclohexanediol. These glycols may be reacted with the proper molar ratio of aliphatic, cycloaliphatic or aromatic acids or their ester forming derivatives to produce low molecular weight polymers terminated with hydroxyl groups. Suitable acids for preparing the polyesters are: succinic, adipic, suberic, sebacic, isophthalic and the like. The alkyl and halogen-substituted derivatives of these acids may also be used.

Also contemplated for use in the practice of this invention are those hydroxyl-terminated polyesters which are derived by reacting a lactone having at least six carbon atoms in the ring with an alkylene glycol. Suitable lactones are epsilon-caprolactone, zeta-enantholactone, eta-caprylolactone and methyl substituted derivatives. Illustrative of the glycols which may be used are ethylene glycol, propylene glycol, butylene glycol, and the like.

The polyesters used to make the "soft" segments of the elastomer need not be restricted to homopolymers, since copolymers are equally useful. In fact, copolymers are often preferred since they show less tendency toward undesirable crystallization in the final segmented polymer. In any case, a polyester is chosen such that it melts below about 60° C.

Furthermore, the polyester may contain a single type of linkage such as in the conventional polyesters, or it may have more than one type of linkage, as in the polyesters chain-extended with diisocyanates. In the latter case, ester and occasionally urethane linkages occur in the polymer chain.

As an alternative to the polyesters just described, there may be used, as noted above, dihydroxy-terminated low molecular weight linear polyethers. Representative difunctional polyethers which may be used include the poly-(alkylene oxide) glycols such as poly(ethylene oxide)glycol, poly(propylene oxide)glycol, poly(tetramethylene oxide)glycol, poly(pentamethylene oxide)glycol, poly(hexamethylene oxide)glycol, poly(heptamethylene oxide)glycol, poly(octamethylene oxide) glycol, poly(nonamethylene oxide) glycol, poly(decamethylene oxide)glycol and the like. As in the case of polyesters, the polyether may be a homopolymer or a copolymer.

As diisocyanates, there may be employed the aromatic diisocyanates of the phenylene, biphenylene and alkylene diphenyl types. Suitable diisocyanates are, for example, m-phenylene diisocyanate, p-phenylene diisocyanate, tolylene diisocyanate, 4,4'-diphenylene diisocyanate, 4,4'-diphenyl dimethyl methane diisocyanate, p,p'-isopropylidene diphenyl diisocyanate and p,p'-methylene diphenyl diisocyanate. The preferred diisocyanate is p,p'-methylene diphenyl diisocyanate.

The dipiperidyls employed in the production of the novel elastomers of the present invention may be represented by the formula:

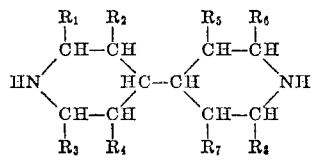

wherein $R_1$–$R_8$ are as defined above. While for convenience in illustration, the 4,4'-dipiperidyl isomer is illustrated herein, it is to be understood that it is within the scope of this invention to employ other isomers such as the 3,4'-, 3,3'-, and 2,4-isomers. Illustrative of dipiperidyls which may be employed to produce the elastomers of the present invention are: 4,4'-diperidyl; 2,2'-dimethyl-4,4-dipiperidyl; 3-methyl - 2'-ethyl - 4,4'-dipiperidyl; 2, 2',5,5'-tetramethyl-4,4'-dipiperidyl; 3,3'-dipiperidyl; 5,5'-diethyl-3,3'-dipiperidyl; 2,6'-dimethyl-3,4'-dipiperidyl, and the like.

It is the reaction between the polyhydroxyl compound and the diisocyanate that forms the urethane linkage between the "soft" and "hard" segments of the elastomeric polymers of this invention. As has been noted, the "hard" segment is formed by reacting the isocyanate modified polyhydroxy compound with dipiperidyl to form a polymer having urea linkages. The preferred length of the "hard" segment depends upon the melting point of the segment and to some extent upon the molecular weight of the "soft" segment. The length of the "hard" segment may be controlled by adding additional amounts of diisocyanate together with the dipiperidyl in the chain-extending reaction. The urea segment may constitute a single unit of the polyurea or many such units, but should not exceed 40 percent by weight of the total elastomer. That is, to produce polymers which are elastomers at room temperatures, it is required that the "soft" segments comprise from about 60 to 95 percent by weight of the polymeric product and that the "hard" segment be in the range of from about 5 to 40 percent by weight.

The elastomeric polymers of this invention should have a specific viscosity above 0.18. That is, the molecular weight should be in the fiber-forming range of 10,000 or above. Specific viscosity, $\eta_{sp}$, is defined as $$\eta_{sp.} = \frac{\eta - \eta_0}{\eta_0} - 1$$

wherein $\eta$ is the viscosity of 0.2 g. of polymer in 100 ml. of dimethylformamide solution at 25° C., and $\eta_0$ is the viscosity of the pure solvent at the same temperature.

Filaments can be prepared from these polymers by dry or wet spinning methods. Conventional conditions are used when employing either method except that spinning speeds are usually lower than those normally applied in spinning other textile filaments. The preferred solvents for wet spinning are N,N-dimethylformamide and N,N-dimethylacetamide, and these solutions are usually extruded into a hot water bath.

A drawing operation is usually not necessary to develop satisfactory elastic properties in the filaments of this invention. However, the overall properties of the filaments are often improved by a drawing operation which results in increased orientation and/or crystallinity in the final structure.

The following specific example is presented for illustrative purposes only and is not to be construed in any limited sense. The physical properties given were measured on the Instron fiber testing device. "Tenacity" is a measure of the tensile strength of fibers expressed in grams per denier (g.p.d.). "Tensile recovery" is the quotient of the contraction of the fiber from its point of 300% extension in the second cycle to its relaxed state at the end of the fourth cycle, divided by the 300% extension, expressed as percentage.

EXAMPLE I 1,020 grams of a polyester prepared from a mixture of 80 parts by weight of epsilon-caprolactone and 20 parts by weight of methyl-caprolactone (molecular weight 2,000) was dissolved in 600 ml. of dimethylformamide. 262 grams of p,p'-methylene diphenyl diisocyanate was added followed by 5 ml. of a 1 percent solution of stannous octoate in heptane. The temperature of the solution was adjusted to 24–25° C. and held at that temperature for one hour. The resulting isocyanate modified polyester constituted the "prepolymer."

1 gram of 4,4'-dipiperidyl was dissolved in 100 ml. of dimethylformamide at 70° C. The solution was cooled to 50° C. and mixed with the prepolymer solution prepared above. A viscous polymer dope was obtained from which film was cast which had the following properties: tenacity, 0.4 gram per denier; tensile recovery, 94.3 percent. Fibers wet spun from the polymer dope had similar high tenacity and tensile recovery. They also exhibited a high stability to both ultra violet light and chlorine bleach.

As is quite apparent the fiber-forming elastomers of this invention find their greatest usefulness in the manufacture of fabrics and garments when elastic quality is desired. They may be employed in these end uses as uncovered filaments or they may be covered, as rubber, in such applications. They have many advantages over rubber threads. For example, they may be spun readily into multi-filament yarns and into low denier filaments. Furthermore, they may be dyed by common dyestuffs and have a good resistance to perspiration or greases and many other common chemicals.

It will be apparent that many widely different embodiments of this invention may be made without departing from the spirit and scope thereof, and, therefore, it is not intended to be limited in any way except as indicated in the appended claims.

We claim:

1. A synthetic, fiber-forming elastomer having a specific viscosity above 0.18 and an essentially linear segmented polymer structure, said segmented polymer consisting essentially of a plurality of intra-linear structural units having the formula:

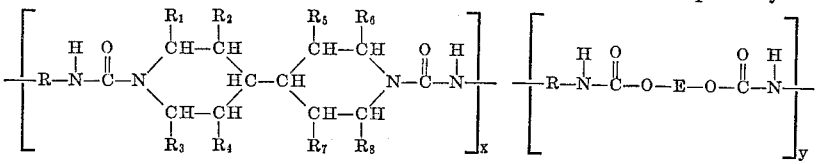

wherein R is an aromatic radical selected from the class consisting of phenylene, biphenylene and alkalene diphenyl radicals $R_1$ through $R_8$, which may be the same or different are members selected from the class consisting of methyl radicals, ethyl radicals and hydrogen, E is a long chain linear polymeric radical containing recurring linkages selected from the class consisting of ester and ether linkages and $x$ and $y$ are integers greater than zero, said radical E having a structure such that a hydroxyl-terminated polymer of the formula:

HO—E—OH has a melting point below about 60° C. and a molecular weight in the range of about 600 to 5,000, wherein the structure

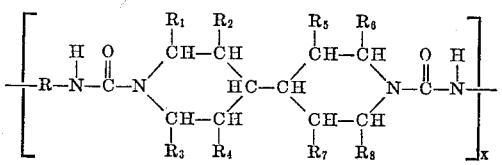

represents a repeating unit of a linear urea polymer having a melting point above 200° C. when of a molecular weight above 10,000, and provides from 5 percent to 40 percent of said segmented polymer, and wherein from about 60 percent to 95 percent by weight of said segmented polymer is provided by the structure

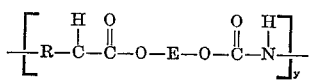

2. The synthetic, fiber-forming elastomer of claim 1 wherein E is a linear polyester radical having a molecular weight between about 750 and 3,500.

3. The synthetic, fiber-forming elastomer of claim 1 wherein E is a linear polyether radical having a molecular weight between 750 and 3,500.

4. The synthetic, fiber-forming elastomer of claim 1 wherein R is the aromatic radical remaining after removal of the isocyanate groups from p,p'-methylene diphenyl diisocyanate.

5. The synthetic, fiber-forming elastomer of claim 1 wherein E is a polyester radical derived from a mixture of 80 parts by weight of epsilon-caprolactone and 20 parts by weight of methyl-caprolactone and $R_1$ through $R_8$ are hydrogen.

References Cited

UNITED STATES PATENTS 3,281,397  10/1966  Axelrod _____ 260—77.5
3,294,724  12/1966  Axelrod _____ 260—77.5

MURRAY TILLMAN, *Primary Examiner.*

SAMUEL H. BLECH, *Examiner.*

P. LIEBERMAN, *Assistant Examiner.*